US008997012B2

(12) United States Patent
Aonuma et al.

(10) Patent No.: US 8,997,012 B2
(45) Date of Patent: Mar. 31, 2015

(54) INFORMATION PROCESSING DEVICE AND INFORMATION PROCESSING SYSTEM

(75) Inventors: Hiroaki Aonuma, Kanagawa (JP); Yasutaka Miwa, Tokyo (JP); Masayuki Kasai, Kanagawa (JP); Nobukazu Koyama, Toyko (JP)

(73) Assignees: Sony Corporation, Tokyo (JP); Sony Computer Entertainment Inc., Tokyo (JP)

(*) Notice: Subject to any disclaimer, the term of this patent is extended or adjusted under 35 U.S.C. 154(b) by 295 days.

(21) Appl. No.: 13/325,237

(22) Filed: Dec. 14, 2011

(65) Prior Publication Data

US 2012/0166994 A1 Jun. 28, 2012

(30) Foreign Application Priority Data

Dec. 22, 2010 (JP) ................................. 2010-286361
Jun. 2, 2011 (JP) ................................. 2011-124571

(51) Int. Cl.
*G06F 3/048* (2013.01)
*G06F 11/30* (2006.01)
*G06F 11/32* (2006.01)

(52) U.S. Cl.
CPC ........ *G06F 11/3055* (2013.01); *G06F 11/3013* (2013.01); *G06F 11/328* (2013.01); *A63F 2300/556* (2013.01); *A63F 2300/5566* (2013.01)
USPC ............................. 715/772; 715/733; 715/741

(58) Field of Classification Search
None
See application file for complete search history.

(56) References Cited

U.S. PATENT DOCUMENTS

| 7,558,820 | B2 | 7/2009 | Kimoto |
| 7,914,381 | B2 | 3/2011 | Blythe |
| 2005/0209002 | A1 | 9/2005 | Blythe |
| 2005/0216595 | A1* | 9/2005 | Miyata et al. ................. 709/227 |
| 2006/0070037 | A1 | 3/2006 | Canning |
| 2006/0221857 | A1* | 10/2006 | Bushnell et al. .............. 370/254 |
| 2007/0118809 | A1* | 5/2007 | Ozugur et al. ................ 715/776 |
| 2007/0173325 | A1* | 7/2007 | Shaw et al. .................... 463/42 |

FOREIGN PATENT DOCUMENTS

| CN | 101361092 A | 2/2009 |
| JP | 2007-531568 A | 11/2007 |
| JP | 2009523541 A | 6/2009 |
| WO | 2007087078 A2 | 8/2007 |
| WO | 2009055358 A1 | 4/2009 |

OTHER PUBLICATIONS

Japanese Office Action for corresponding application 2011-124571, dated Jan. 15, 2013.

(Continued)

*Primary Examiner* — Anil N Kumar
(74) *Attorney, Agent, or Firm* — Matthew B. Dernier, Esq.; Gibson & Dernier LLP (57) ABSTRACT

An acquisition unit acquires, via a communication unit, presence information including status information indicating the status of execution of an application from a separate information processing device. A status image generation unit refers to the status information and determines a display mode for presenting the status of execution of the application to a user. The status image generation unit determines a display mode of a mark to indicate whether the user can participate in a session of an application.

13 Claims, 6 Drawing Sheets

(56) References Cited

OTHER PUBLICATIONS

European Search Report for corresponding application EP11009853.0-1225, dated Feb. 23, 2012.

Office Action for corresponding application CN 201110429374.1, dated Feb. 25, 2014.

Office Action for corresponding application JP 2013101408, dated Aug. 5, 2014.

* cited by examiner

INFORMATION PROCESSING DEVICE AND INFORMATION PROCESSING SYSTEM

BACKGROUND OF THE INVENTION

1. Field of the Invention

The present invention relates to information processing devices and information processing systems.

2. Description of the Related Art

Game devices provided with communication facilities are widely used, allowing multiple users to enjoy a chat or an online game. Also, game programs are often installed in personal computers instead of devices designed especially for games. It is quite common for users to enjoy an online game using personal computers.

Mobile game devices and personal digital assistants (PDA) have also been used widely. Recently, multiple-function electronic appliances such as smartphones, in which functions of a cell phone and a PDA are integrated, have become available. These electronic appliances are provided with a large-capacity memory and a high-speed processor and allow multiple users to chat or play an online game by downloading and installing an application program.

[patent document No. 1] U.S. Pat. No. 7,558,820

In order to synchronize the execution of the same application between multiple users, it is necessary to create a session of the application and to cause multiple users to participate in the session. Where users join each other to play a game, a session may be created through talks among the users so that each user can participate in the created session. If the users are in remote locations, they cannot see each other's situation with their own eyes. There is called for development of a user interface that allows users to see each other's situation easily and simplifies the procedure for participation in a session as much as possible.

SUMMARY OF THE INVENTION

In this back ground, a purpose of the present invention is to provide a technology that allows participation in a session of an application with a simple operation.

In order to address the challenge, the information processing device according to an embodiment of the present invention comprises: a communication unit; an acquisition unit configured to acquire, via the communication unit, presence information including status information indicating the status of execution of an application in another (or a separate) information processing device; and a status image generation unit configured to generate a status image indicating the status of the application, based on the acquired presence information. The status image generation unit refers to the status information and determines a display mode for presenting the status of execution of the application to a user.

Another embodiment of the present invention relates to an information processing system. The information processing system is configured such that a plurality of information processing devices are connected. Each information processing device comprises: a communication unit; an execution unit configured to execute an application; a presence information generation unit configured to generate presence information including status information indicating the status of execution of an application; a transmission unit configured to transmit the generated presence information via the communication unit; an acquisition unit configured to acquire, via the communication unit, presence information including status information of each of the plurality of information processing devices; and a status image generation unit configured to generate a status image indicating the status of the application, based on the acquired presence information. The status image generation unit refers to the status information included in the acquired presence information and determines a display mode for presenting the status of execution of the application to a user.

Optional combinations of the aforementioned constituting elements, and implementations of the invention in the form of methods, apparatuses, systems, computer programs, data structures, and recording mediums may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

Figure 1:
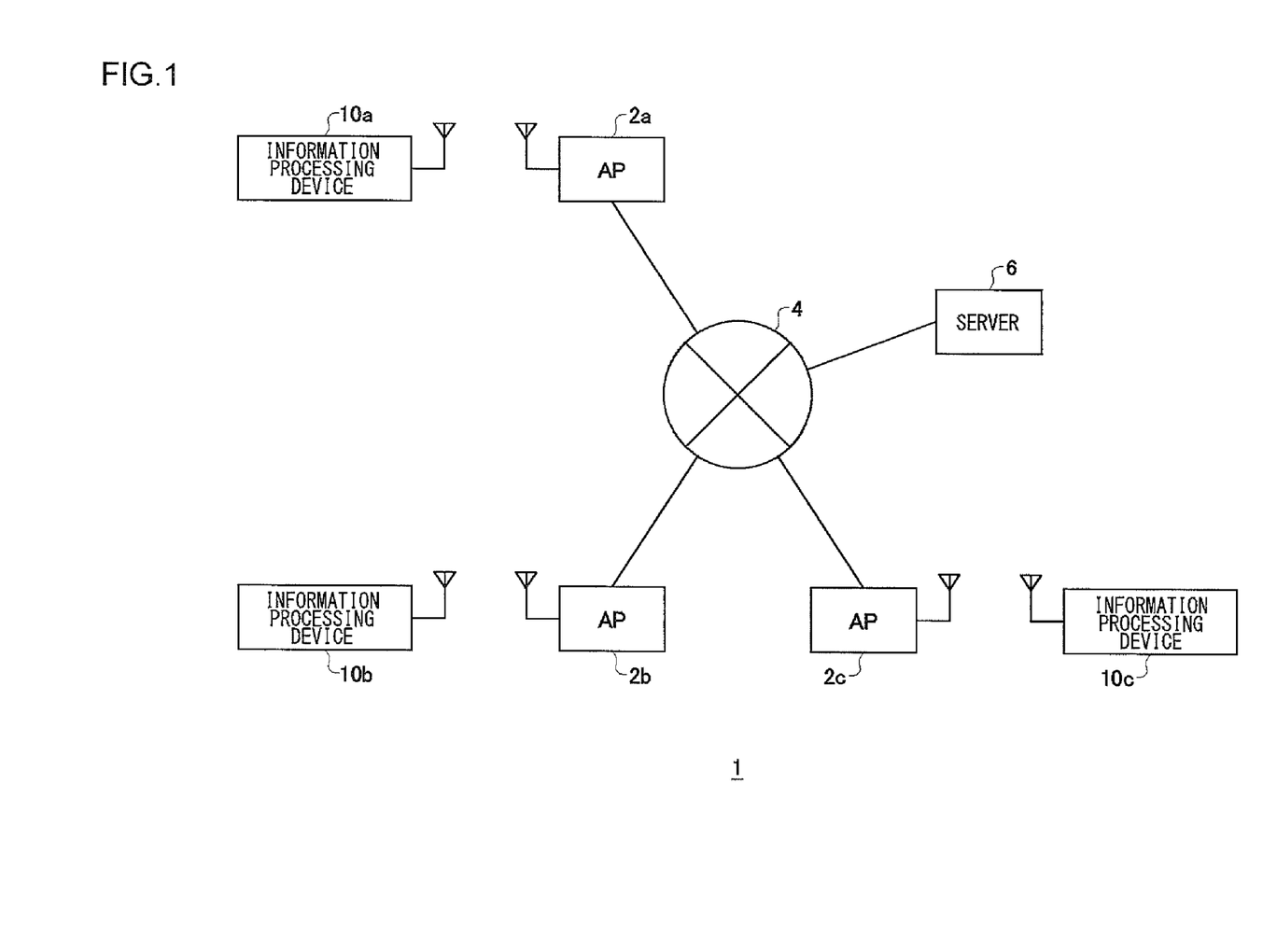
FIG. 1 shows an example of an information processing system according to the embodiment.

FIG. 1 shows an example of an information processing system 1 according to the embodiment. In the information processing system 1, a plurality of information processing devices 10a, 10b, and 10c (hereinafter, referred to as "information processing devices 10" where no distinction is required) are connected so that the devices can exchange data. In the information processing system 1, each information processing device 10 is provided with wireless communication functions, connects to a network 4 via an access point 2 (hereinafter, referred to as "AP"), and exchanges data with another information processing device 10 via a server 6. The information processing device 10 may be provided with functions of communicating using a wireless local area network (LAN) system so as to communicate with another information processing device 10 via the server 6 in the infrastructure mode or directly communicate with another information processing device 10 in the ad-hoc mode. Alternatively, the information processing device 10 may communicate with another information processing device 10 using the Bluetooth (registered trademark) protocol instead of a wireless LAN system. Still alternatively, the information processing device 10 may communicate with another information processing device 10 using a communication scheme complying with a 3G wireless communication system. As described above, the information processing devices 10 are provided with communication functions and so can exchange data with each other. The information processing device 10 may communicate with another information processing device 10 by cable.

The AP 2 functions as a router for connecting the information processing device 10 to another access point using wireless LAN or connecting the information processing device 10 to the network 4 such as the Internet or a wired LAN. The AP2a functions as a router for the information processing device 10a, the AP2b functions as a router for the information processing device 10b, and the AP2c functions as a router for the information processing device 10c. The number of information processing devices 10 is not limited to three. More devices may be provided. In this embodiment, the server 6 routes data between a plurality of information processing devices 10, but the information processing devices 10 may directly exchange data.

Figure 2:
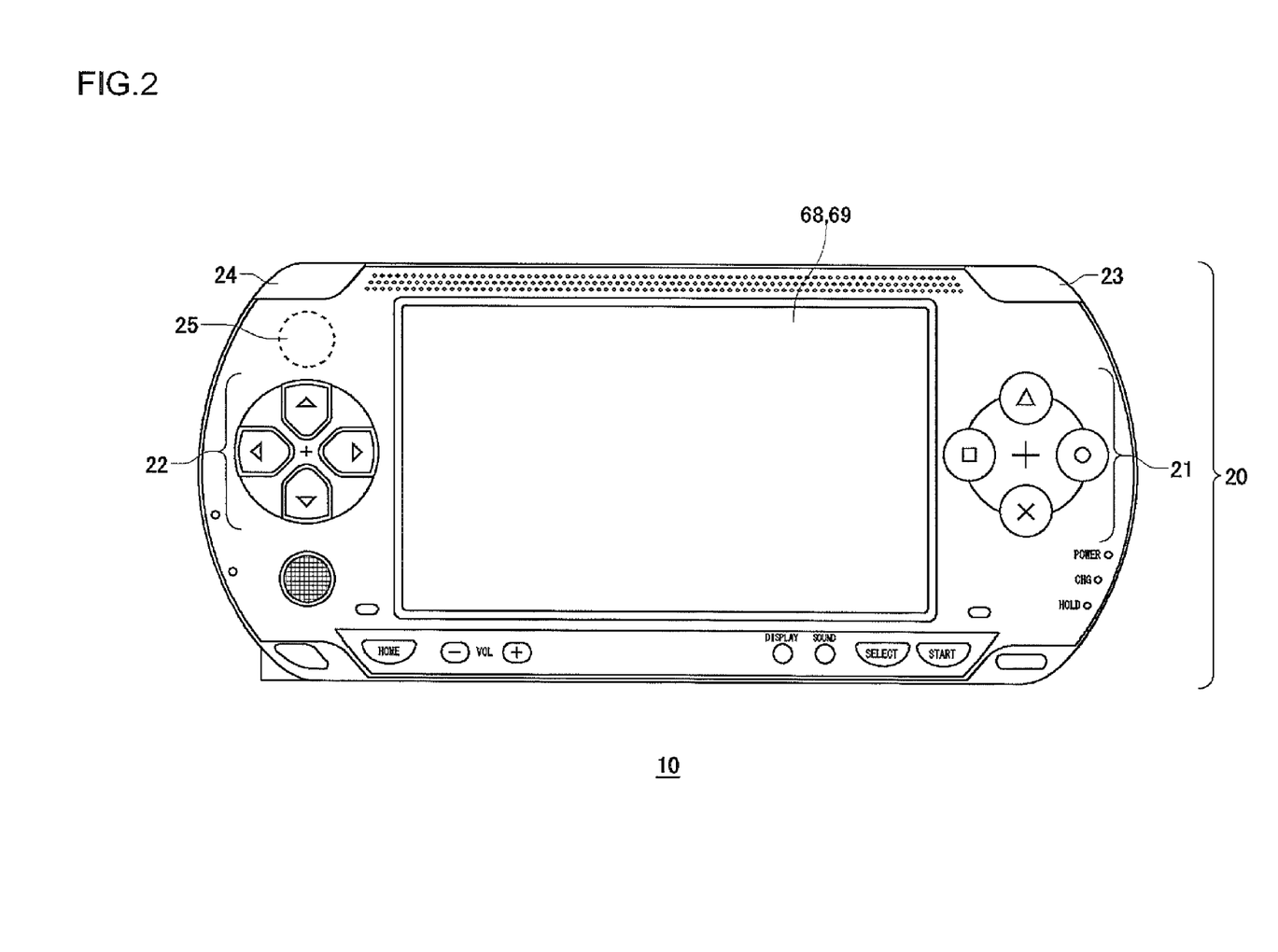
FIG. 2 shows an exemplary appearance of the information processing device according to the embodiment.

FIG. 2 shows an exemplary appearance of the information processing device 10 according to the embodiment. The information processing device 10 shown in FIG. 2 is a mobile terminal and is provided with wireless communication functions. As described above, the information processing device 10 may communicate with another information processing device 10 by cable. Alternatively, the information processing device 10 may be a desktop terminal instead of a mobile terminal.

As shown in FIG. 2, the front face of the information processing device 10, i.e., the side facing the user as the user holds and controls the information processing device 10, is provided with an input device 20 such as command input buttons 21, directional keys 22, an R button 23, and an L button, and is also provided with a display device 68. A touch panel 69 for sensing contact by the user's finger or a stylus pen is coupled to the display device 68. Inside the information processing device 10 is provided a tilt sensor 25 for sensing the tilt of the information processing device 10. A rear touch panel may be provided on the backside of the information processing device 10.

The user holding the information processing device 10 with both hands can control the command input buttons 21 with the right thumb, control the directional keys 22 with the left thumb, control the R button 23 with the right index finger or middle finger, and control the L button 23 with the left index finger or middle finger. To control the touch panel 69, the user may hold the information processing device 10 with both hands and use the touch panel 69 with the thumbs. Alternatively, the user may hold the information processing device 10 with the left hand, use the touch panel 69 with the right hand, control the directional keys 22 with the left thumb, and control the L button with the left index finger or middle finger.

A summary of the embodiment will be given. Initially, the information processing device 10a in the information processing system 1 generates a command to create a session of a certain application. The application allows participation of a plurality of users (multiplayer online application). Typical examples of the application include chat applications and games. The application may be of a different type. When the information processing device 10a transmits the generated command for creation to the server 6, the server 6 creates a session according to the command for creation. More specifically, the server 6 issues identification information identifying a session (hereinafter, referred to as "session ID") and transmits the identification information to the information processing device 10a. The session ID may be a universal resource identifier (URI) for connecting to the server 6 used by the information processing devices 10 participating in the session to communicate synchronously via the server 6.

The information processing device 10a transmits presence information including the acquired session ID to the server 6. The other information processing devices 10b and 10c acquire the presence information of the information processing device 10a by periodically accessing the server 6. For a plurality of information processing devices 10 to communicate in the ad hoc mode, the information processing device 10a directly transmits presence information to the other information processing devices 10b and 10c. In this process, the information processing device 10a includes, in the presence information, status information indicating the status of executing the application. The status information includes information indicating whether participation in the session of the application is permitted or not. When the information processing devices 10b and 10c acquire the presence information, the devices 10b and 10c generate a GUI (status image) indicating the status of the application in the information processing device 10a and present whether the user can participate in the session of the application. If the status information includes information indicating a permission for participation, the information processing devices 10b and 10c generate a GUI that allows the user to select a "Join" mark. Conversely, if the status information includes information indicating a prohibition for participation, the devices 10b and 10c generate a GUI that does not allow the user to select a "Joint" mark. This allows user B of the information processing device 10b and user C of the information processing device 10c to check the status of the application of user A using the information processing device 10a and can easily see whether it is possible to participate in the session.

Figure 3:
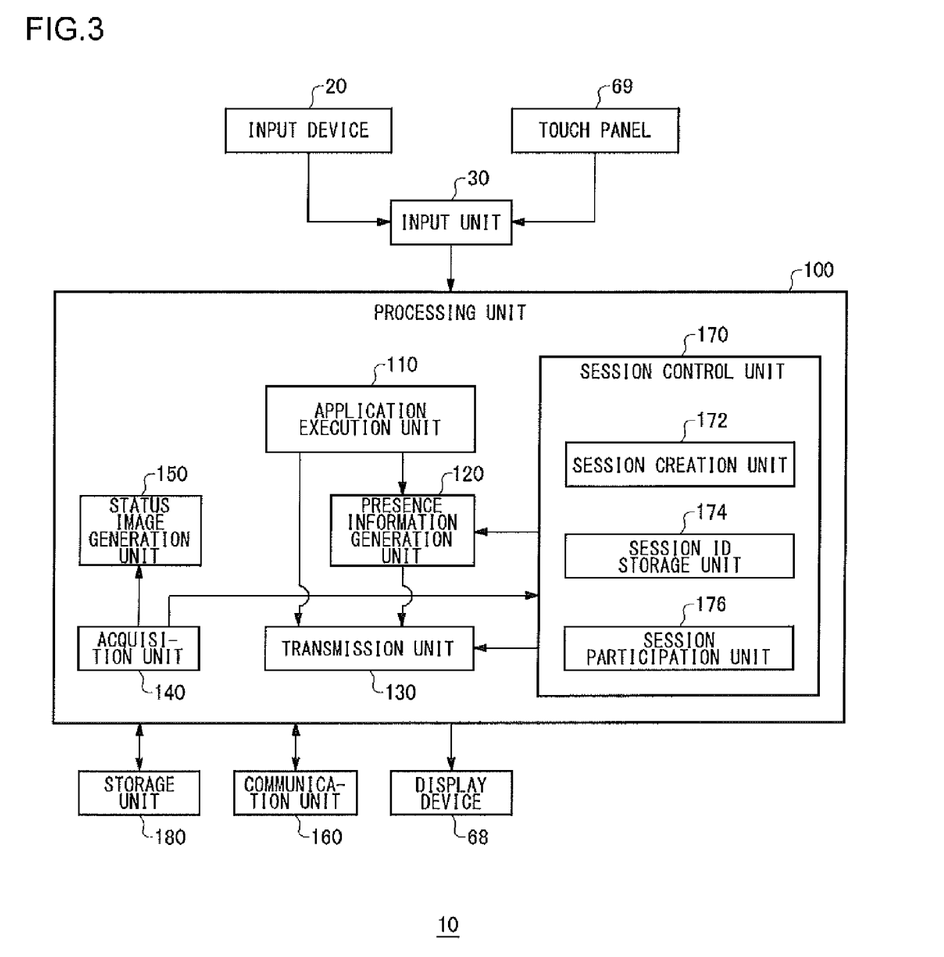
FIG. 3 shows functional blocks of the information processing device.

FIG. 3 shows functional blocks of the information processing device 10. The information processing device 10 comprises an input device 20, a touch panel 69, an input unit 30, a processing unit 100, a display device 68, a communication unit 160, and a storage unit 180. The elements depicted in FIG. 3 are implemented by hardware components such as a CPU and a memory of an arbitrary computer, or by a program etc., loaded into the memory. FIG. 3 depicts functional blocks implemented by the cooperation of these elements. Therefore, it will be obvious to those skilled in the art that the functional blocks may be implemented in a variety of manners by hardware only, software only, or a combination of thereof.

The input unit 30 acknowledges a user command entered by using the input device 20 or the touch panel 69. The communication unit 160 exchange data with another information processing device 10 by connecting to the device 10 via the server 6. As mentioned above, the communication unit 160 may connect to another information processing device 10 wirelessly or by cable. When the processing unit 100 acquires presence information from another information processing device 10, the processing unit 100 generates a status image indicating the status of the application and presents the generated image to the user. The display device 68 displays the status image generated by the processing unit 100 and also displays a screen showing the application being executed.

The processing unit 100 comprises an application execution unit 110, a presence information generation unit 120, a transmission unit 130, an acquisition unit 140, a status image generation unit 150, and a session control unit 170. The session control unit 170 comprises a session creation unit 172, a session ID storage unit 174, and a session participation unit 176.

The session control unit 170 controls a process related to a session of an application by cooperating with the server 6. More specifically, the session control unit 170 has the role of allowing the information processing device 10 to participate in a session of an application by allowing the session creation unit 172 to generate a command to create a session, allowing the session ID storage unit 174 to store a session ID defined by the server 6, and allowing the session participation unit 176 to include the session ID stored in the session ID storage unit 174 in the transmission data. The function of the session control unit 170 may be implemented by an application. The session ID defined by the server 6 may be delivered to the application so that the application participates in the session using the session ID.

The information processing device 10 according to the embodiment communicates presence information indicating the status of the information processing device 10 to another information processing device 10 via the server 6 and acquires presence information indicating the status of another information processing device 10 from the other information processing device 10. To facilitate the understanding of the embodiment, a description will be given below of a case where the information processing device 10a in the information processing system 1 of FIG. 1 transmits presence information and the information processing device 10b acquires the presence information generated by the information processing device 10a, with reference to the functional blocks shown in FIG. 3. All of the information processing devices 10a, 10b, and 10c are provided with functions of both transmitting and receiving presence information. It is not true that the information processing device 10a is only provided with the transmission function and the information processing device 10b is only provided with the reception function.

<Function of Transmitting Presence Information>

The application execution unit 110 in the information processing device 10a starts an application such as a chat application or a game in which a plurality of users can participate, in accordance with a control command acknowledged by the input unit 30. In this process, the session creation unit 172 generates a command to create a session for allowing another user to participate in the application, and the transmission unit 130 transmits the command to the server 6. The command to create a session includes identification information of user A (hereinafter, referred to as "user account ID") and information identifying the application (hereinafter, referred to as "application ID"). Upon receipt of the command to create a session, the server 6 defines a session ID and creates a session of the application executed by the application execution unit 110. The server 6 transmits the session ID to the information processing device 10a and the acquisition unit 140 acquires the session ID via the communication unit 160. The acquired session ID is stored in the session ID storage unit 174. As described above, the session ID may be maintained by the application.

The application execution unit 110 may execute a plurality of multiplayer online applications concurrently. To execute a plurality of applications concurrently, the session creation unit 172 generates a command to create a session for each application. The server 6 creates a session for each received command for creation and communicates the session ID to the information processing device 10a.

The application execution unit 110 generates status information indicating the status of execution of the application by user A and executes the application accordingly. The status information indicates whether participation of another user in the application being executed is permitted or not. For example, the status information may be represented by a flag value such that a flag value of 1 represents participation permission information indicating that another user can participate and a flag value of 0 represents participation prohibition information indicating that another user cannot participate.

For example, the application execution unit 110 may define a limit to the number of participants in a chat session. The user may enter an upper limit to the number of participants in an application. If an upper limit is defined for the number of participants, the application execution unit 110 delivers status information having a flag value of 1 indicating that participation is possible (participation permission information) to the presence information generation unit 120 if the upper limit to the number of participants is not reached. If the upper limit to the number of participants is reached, the application execution unit 110 delivers status information having a flag value of 0 indicating that participation is impossible (participation prohibition information) to the presence information generation unit 120. In a game session of a car race, for example, the application execution unit 110 delivers status information having a flag value of 1 to the presence information generation unit 120 before the race is started. Once the race is started, the application execution unit 110 delivers status information having a flag value of 0 to the presence information generation unit 120. Thus, the application execution unit 110 determines whether another information processing device 10 can participate in the session of the application being run. As described, the information processing system 1 is configured such that determination as to whether another user can participate in an application session is made by the application itself and the result of determination is delivered to the presence information generation unit 120 as status information.

The presence information generation unit 120 generates presence information including status information indicating the execution state of the application. The presence information includes a user account ID, a session ID, and an application ID as well as the status information of the application. Further, the presence information may include information such as a history of playing games in the information processing device 10a, and a user icon. In case a plurality of applications are being run concurrently, the session ID's and application ID's of the applications, and the status information of the applications are included in the presence information. The presence information generation unit 120 stores the latest status information of the applications in the storage unit 180. If a change in the status arises in any of the applications, the presence information generation unit 120 generates presence information including the latest status information of the applications. The presence information generation unit 120 generates presence information by receiving the application ID and the status information of the application from the application execution unit 110 and receiving the session ID from the session ID storage unit 174. If the application maintains the session ID, the session ID is provided by the application. If, for example, a history of playing is included in the presence information, the presence information generation unit 120 reads necessary information from the storage unit 180.

In the event that a change occurs in the status of the information processing device 10a, the presence information generation unit 120 generates (updates) the presence information. For example, if the status information of the application changes, the presence information generation unit 120 updates the presence information. In the case of a chat session, the status information changes when, for example, one or more players leaves the chat room where the upper limit of the number of participants was reached initially, with the result that the number of participants is less than the upper limit, or, conversely, when one or more players enters the chat room where the upper limit of the number of participants is not reached, with the result that the upper limit of the number of participants is reached. When there is a change in the result of determination by the application execution unit 110 as to whether another user can participate, the presence information generation unit 120 generates (updates) the presence information.

Typically, the presence information generation unit 120 updates the presence information at any of the following points of status change.

(1) When an application is started.
(2) When participation of another user is permitted in an application.
(3) When participation of another user is prohibited in an application where participation of another user was initially possible.
(4) When an application is ended.

Points of status change may not be limited to (1)-(4) above. Additional changes may be arbitrarily defined by the application. The points of status change thus defined prompt the updating of the presence information.

In connection with points of status change discussed above, the relation between the application ID and the status information included in the presence information will be described below. When an application is started, the presence information includes an application ID and status information having a flag value of 0 (participation prohibition information). When another user is allowed to participate in the application, the application ID and the status information having a flag value of 1 (participation permission information) are included in the presence information. When another user is no longer allowed to participate in the application, in which another user was allowed to participate previously, the application ID and the status information having a flag value of 0 (participation prohibition information) are included in the presence information. When the application is ended, neither the application ID nor the status information is included in the presence information. In other words, presence information indicating the termination of the application is generated in this case by not including the application ID, etc. in the presence information. In the example discussed above, the status information represents information identifying a permission or a prohibition for participation. Alternatively, where the clearing of a predetermined mission in a game or obtaining of a predetermined item is defined as a point of status change, the clearing of a mission or the obtaining of an item may be included in the presence information as status information.

Where a plurality of applications are being executed and a status change occurs in any of the applications, the presence information generation unit 120 includes the latest post-change information in the presence information. For applications where a status change does not occur, the presence information generation unit 120 includes the latest status information stored in the storage unit 180 in the presence information.

The transmission unit 130 transmits the presence information generated by the presence information generation unit 120 to the server 6 via the communication unit 160. The server 6 registers specific users called "friends" for each user in the form of a list. A friend is registered when an agreement is reached between users. By increasing friends, users can increase fellow users to chat or play a game with. The server 6 maintains a friend list of user A. When a request for acquire the presence information is received from a user included in the friend list of user A, the server 6 transmits the presence information of user A to the requesting user. If users B and C are listed in the friend list, the server 6 transmits the presence information of user A to the information processing device 10b of user B and the information processing device 10c of user C in response to the request for acquiring the presence information. Described above is a process in the information processing device 10a transmitting the presence information.

<Function of Receiving Presence Information>

The acquisition unit 140 in the information processing device 10b periodically accesses the server 6 via the communication unit 160 so as to acquire the presence information in the information processing device 10a. The presence information acquired by the acquisition unit 140 may be the unmodified presence information generated in the information processing device 10a or modified information, i.e., information resulting from addition or deletion of some information in the server 6. In any case, the acquired presence information includes the application ID of the application executed in the information processing device 10a, the session ID, the user account ID, and the status information indicating the status of execution of the application. The status image generation unit 150 generates a status image showing the status of the application based on the acquired presence information. The status image at least presents the status of the application executed in the information processing device 10a to the user. The status image may additionally present the status of the application executed locally (in the information processing device 10b) to the user. The status image generation unit 150 refers to the status information and determines a display mode for presenting the status of execution of the application to the user.

Figure 4:
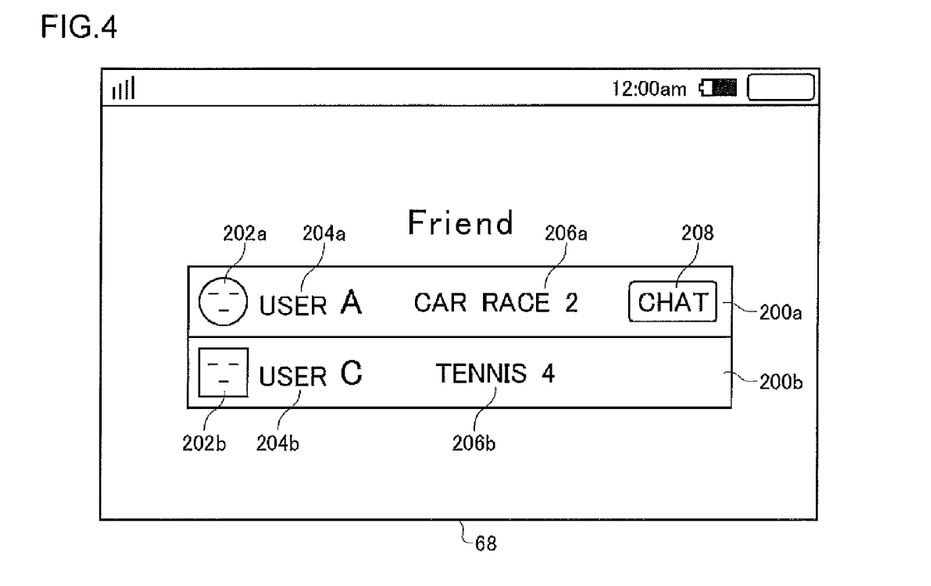
FIG. 4 shows an exemplary friend screen.

FIG. 4 shows an exemplary friend screen. When user B uses the input device 20 or the touch panel 69 to select a button on the menu screen (not shown) for displaying a friend screen, the status image generation unit 150 generates a friend screen. It is assumed here that users A and C are registered as friends of user B. The acquisition unit 140 in the information processing device 10b acquires the presence information in the information processing device 10a of user A and the information processing device 10c of user C. The status image generation unit 150 generates a status image showing the status of the image processing devices 10a and 10c based on the presence information. The presence information is transmitted to the server 6 each time a status change occurs in the other information processing device 10a or 10c. While the communication unit 160 remains connected to the network 4, the acquisition unit 140 periodically accesses the server 6. If the presence information of a friend of user B is updated, the server 6 transmits the updated presence information to the information processing device 10b. Consequently, the acquisition unit 140 acquires the updated presence information. The acquisition unit 140 delivers the presence information to the image generation unit 150 each time the updated presence information is acquired. Upon receipt of the presence information, the status image generation unit 150 overwrites the previous presence information, ensuring that a status image is generated using the latest presence information without fail. Meanwhile, if the communication unit 160 does not remain connected to the network 4, the acquisition unit 140 acquires the presence information from the server 6 at a point of time that user B selects the display button for displaying a friend screen. In this case, the server 6 transmits the latest presence information to the communication unit 160.

The friend screen displays, for each user, part of the presence information acquired by the acquisition unit 140. An application display area 200a shows an application being executed by user A, and an application display area 200b shows an application being executed by user C. In the application display area 200a, an icon 202a represents an icon for user A, a user name 204a represents the name (nickname) of user A, and a game name 206a represents the title of the game being executed by user A. A CHAT mark 208 shows that user A is participating in a chat session. In the application display area 200b, an icon 202b represents an icon for user C, a user name 204b represents the name (nickname) of user C, and a game name 206b represents the title of the game being executed by user C.

FIG. 4 shows two application display areas 200. The number of application display areas 200 matches the number of friends. Therefore, the number of application display areas 200 could be three or more, or one or less, depending on the number of friends. When user B selects the application display area 200a on the friend screen, user B can view detailed information on user A. The selection may be done by tapping the application display area 200a and causing the touch panel 69 to sense the position of tapping. Alternatively, the selection may be made by moving the cursor by using the input device 20.

Figure 5:
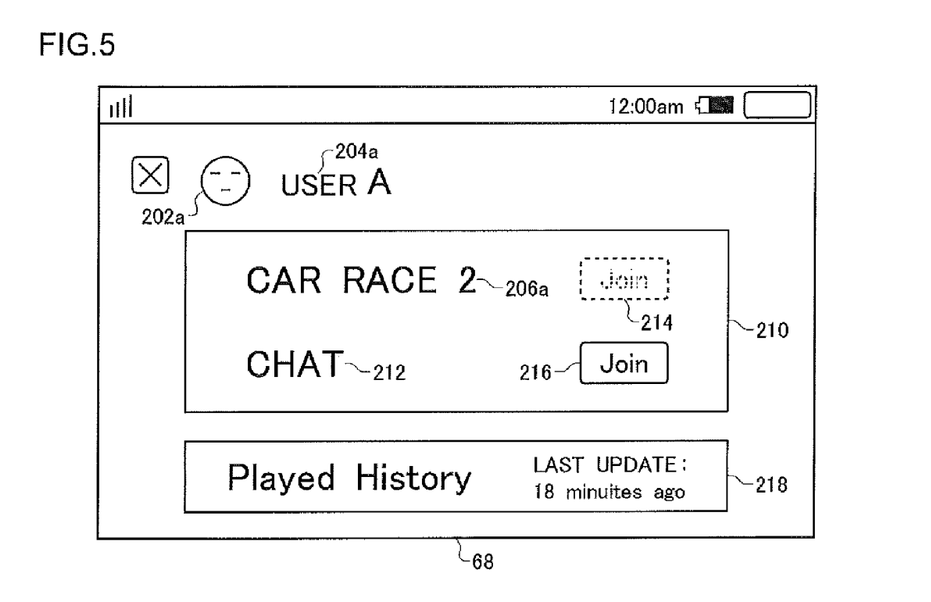
FIG. 5 shows an example of detailed information screen of a friend.

FIG. 5 shows an example of detailed information screen of a friend. The status image generation unit 150 generates a status image showing the status in the information processing device 10a based on the presence information of user A acquired by the acquisition unit 140. The detailed information screen shows an application display area 210, showing the application being executed by user A, and a played history area 218 showing a history of playing by user A. A status image showing other status of the information processing device 10a may be shown. As shown in the application display area 210, user A executes a game title "CAR RACE 2" identified by the game name 206a and the chat application identified by an application name 212 concurrently. These are multiplayer online applications. If the applications run in the information processing device 10a permit participation, user B can participate in each of the sessions.

The status image generation unit 150 in the information processing device 10b refers to the status information and determines display modes of marks for presenting the status of execution of the application to the user. In this case, the marks include Join marks 214 and 216 for presenting a permission or a prohibition for participation to the user. The Join marks 214 and 216 are graphical user interfaces (GUI). If the mark is displayed so as to be selectable by the user, the user can start the application by tapping the Join mark so that the user can participate in the application.

In the embodiment, the status image generation unit 150 determines the display mode of the Join marks 214 and 216 so as to indicate whether user B is allowed to participate in the session of the application. Referring to FIG. 5, the Join mark 214 is displayed in a relatively light color, using dotted lines. Meanwhile, the Join mark 216 is displayed in a relatively dark color, using solid lines. In the illustrated GUI, the Join mark 214 displayed in a relatively light color, using dotted lines, cannot be selected by the user. Meanwhile, the Join mark 216 displayed in a relatively dark color, using solid lines, can be selected by the user.

The status image generation unit 150 generates the Join mark 216 so as to be selectable by the user if the status information includes participation permission information. When user B taps the Join mark 216, the application execution unit 110 acknowledges it as a valid selection and starts the chat application. Further, the session ID storage unit 174 stores the session ID extracted from the presence information of the information processing device 10a. The session ID may be maintained by the application itself. This allows the information processing device 10b to enjoy chatting with the information processing device 10a using the session ID.

In the chat session, the information processing device 10b transmits chat data including at least an input chat text, a session ID, and an account ID of user B to the server 6. The server 6 transmits the chat data to the information processing device 10a. The information processing device 10a refers to the session ID included in the chat data and knows that the data is for the chat session and displays the chat data in the chat window. Similar steps are taken when chat data is transmitted from the information processing device 10a to the information processing device 10b. This allows the information processing devices 10a and 10b to execute the same application concurrently.

Meanwhile, the status image generation unit 150 generates the Join mark 214 such that it cannot be selected by the user if the status information includes participation prohibition information. The Join mark 214 shown in FIG. 5 is displayed in a gray out format and cannot be selected by the user. It is made known to the user that the mark is not selectable. Even if user B taps the Join mark 214, the application execution unit 110 does not acknowledge it as a valid selection and so does not start the game application. The status image generation unit 150 may not include a Join mark in the status image if the status information includes participation prohibition information. This lets user B know that user B cannot participate in "CAR RACE 2".

Figure 6:
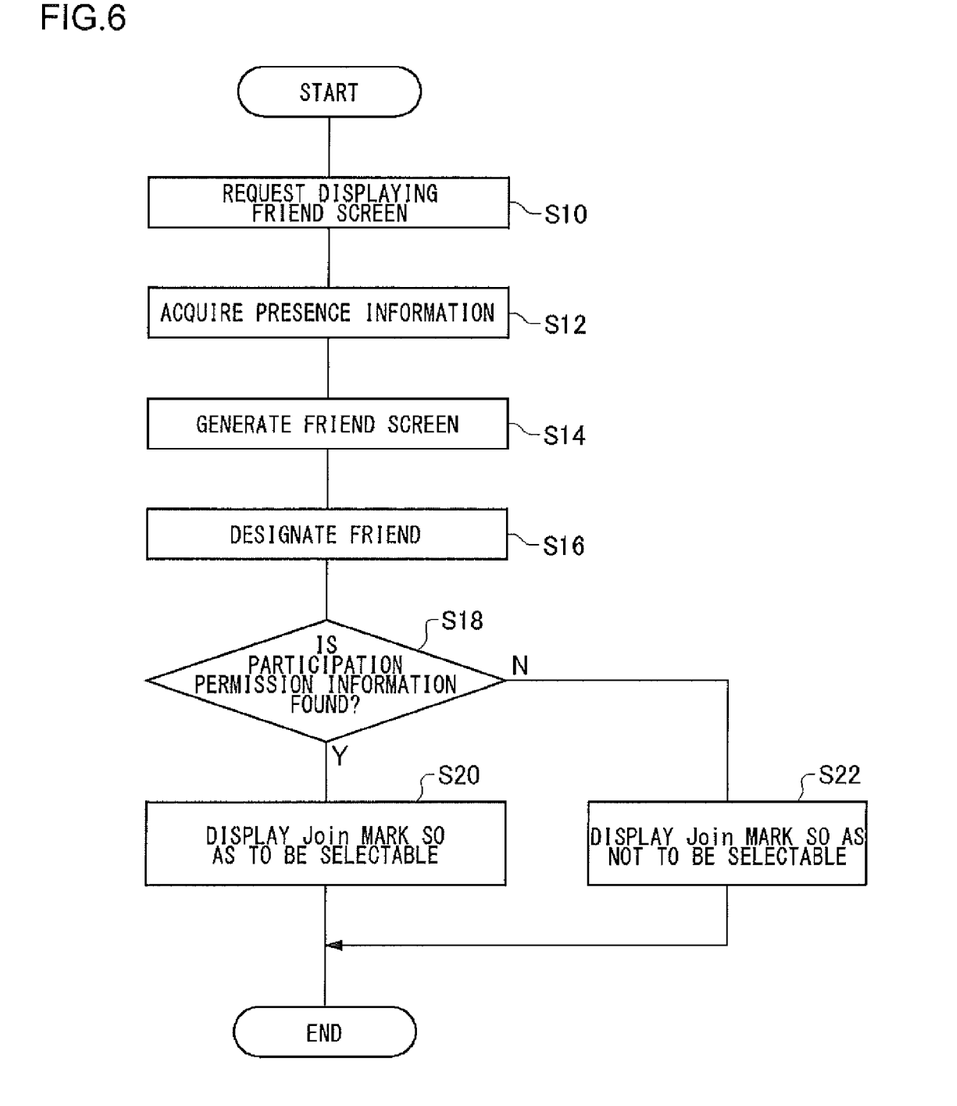
FIG. 6 is a flowchart for generating the GUI shown in FIG. 5.

FIG. 6 is a flowchart for generating the GUI shown in FIG. 5. Referring to the flowchart shown in FIG. 6, the steps in the respective components are denoted by a combination of S (initial letter of Step), which indicates "step", and a numeral. When a determination is made in a step denoted by a combination of S and a numeral and when the result of determination is affirmative, Y (initial letter of Yes) is used to indicate the affirmative determination (e.g., Y in S10). Conversely, when the result of determination is negative, N (initial letter of No) is used to indicate the negative determination (e.g., N in S10).

When user uses the input device 20 or the touch panel 69 to select a button on the menu screen (not shown) for displaying a friend screen (S10), the acquisition unit 140 acquires the presence information of the user registered in the friend list from the server 6 (S12). The status image generation unit 150 generates a friend screen shown in FIG. 4 based on the presence information (S14). When the user selects the application display area 200 of any of the friends subsequently to designate a friend (S16), the status image generation unit 150 generates a detailed information image of the designated friend. The status image generation unit 150 refers to the status information and determines the display mode of the mark for presenting the execution status of the application to the user (S18). If participation permission information is found (Y in S18), the status image generation unit 150 generates the Join mark so as to be selectable by the user (S20). Meanwhile, if participation prohibition information is found (N in S18), the status image generation unit 150 generates the Join mark so as not to be selectable by the user (S22). Thus, the application in a friend determines whether to allow another user to participate in a session depending on the local situation. Therefore, the server load is radically reduced as compared with the case where the server 6 is tasked to make determination.

Figure 7:
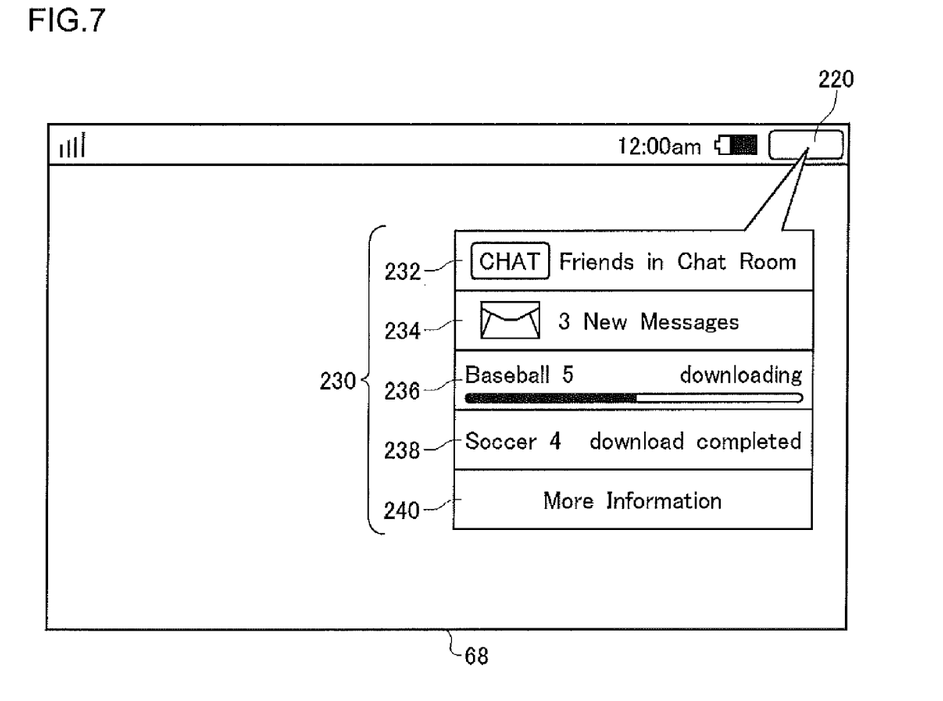
FIG. 7 shows another example of a status image generated by the status image generation unit.

FIG. 7 shows another example of a status image generated by the status image generation unit 150. The status image is generated when the user taps a check area 220. The status image at least includes the status of the application in another user and also includes the status of the application executed locally. The status image generation unit 150 generates a status image including update information indicating that the status of the application has changed.

The acquisition unit 140 periodically accesses the server 6 via the communication unit 160. If the presence information of any of the friends is updated in the server 6, the acquisition unit 140 acquires the updated presence information from the server 6. The acquisition unit 140 periodically accesses the mail server and checks whether a new mail is available. If a new mail has arrived, the acquisition unit 140 acquires the new mail from the mail server.

When the acquisition unit 140 acquires presence information or acquires a new mail, the status image generation unit 150 detects a status change in the application of another user or a status change in the application executed locally. The status image generation unit 150 displays the check area 220 in a mode that attracts attention of the user by, for example, causing the check area 220 to flash so as to let the user know that there is a change in the one of the applications. When the user selects the check area 220, the status image generation unit 150 generates update information indicating a change in the application status and creates an indicator 230.

The status image generation unit 150 creates an indicator 230 that shows a list of update information in the reverse chronological order of the date of update from top to bottom. An update area 232 in the indicator 230 shows update information indicating that there is a change in the chat application participated by a friend. An update area 234 shows update information indicating that there is a new mail. An update information 236 shows update information indicating that a game title "Baseball 5" is being downloaded. An update area 238 shows update information indicating that a game title "Soccer 4" has been downloaded. When the user selects an update area 240, further update information is displayed.

In the example shown in FIG. 7, when the status information generation unit 150 identifies that there is a change in the status information by referring to the acquired presence information, the unit 150 generates update information and shows the update information in the update area 232. The status information changes when, for example, a friend opens a chat room, or when the upper limit of the number of participants in a chat room is reached so that participation is no longer accepted, or when participation becomes possible. When a friend opens a chat room, or when it is possible to participate in a chat room in which it was impossible to participate previously, the status image generation unit 150 generates update information indicating that there is a status change and displays as such in the indicator 230. This allows the user to know immediately when a chat session in which the user can participate is available by viewing the indicator 230. When the user taps the update area 232, the application execution unit 110 starts the chat application. This shows a list of chat rooms created. The user can participate in a chat session by selecting a desired chat room. When it is no longer possible to participate in a chat room in which it was possible to participate previously, the status image generation unit 150 generates update information indicating that there is a status change and displays as such in the indicator 230.

If the status information includes participation prohibition information, i.e., when it is impossible to participate in a chat room in which it was possible to participate previously, the status image generation unit 150 may not cause the check area 220 to flash. In this case, the status image generation unit 150 may not generate update information related to the chat for display in the indicator 230. Even if the presence information indicates that there is a chat session, the user cannot participate in the chat session if participation prohibition information is defined. Therefore, the status image generation unit 150 may not cause the check area 220 to flash even if a chat room in which participation is prohibited is created and may present update information only when a chat room in which participation is permitted is created, for the sake of efficiency.

Described above is an explanation based on an exemplary embodiment. The embodiment is intended to be illustrative only and it will be obvious to those skilled in the art that various modifications to constituting elements and processes could be developed and that such modifications are also within the scope of the present invention.

The plurality of information processing devices 10 according to the embodiment are described as being connected in the infrastructure mode of wireless LAN. Alternatively, the information processing devices 10 may be connected in the ad hoc mode. In this case, the information processing devices 10 can generate a status image suited to the status of the application in another information processing device 10 by exchanging presence information with each other.

The acquisition unit 140 of the information processing device 10 according to the embodiment is described as acquiring presence information by periodically accessing the server 6. Alternatively, the server 6 may transmit presence information to the information processing device 10. In this case, the server 6 may periodically transmit presence information of all users listed in the friend list of the user of the information processing device 10. Alternatively, the server 6 may transmit updated presence information each time the presence information of a user listed in the friend list is updated.

The user can view a detailed information screen of a friend shown in FIG. 5 by tapping the application display area 200 in the friend screen shown in FIG. 4. According to the embodiment, the user determines whether the user can participate in an application by referring to the display mode of the Join mark in the detailed information screen of a friend.

In one variation, the user can determine whether the use can participate in an application by seeing the friend screen shown in FIG. 4. The status image generation unit 150 refers to the status information and determines a display mode of the application display area 200 to present the status of execution of the application to the user. In this process, the status image generation unit 150 uses different display modes for the application display area 200 displayed when the status information includes participation permission information and for the application area 200 displayed when the status information does not include participation permission information.

For example, a description will be given of a case where participation prohibition information is defined for the game title "CAR RACE 2" being executed by user A and participation permission information is defined for the game title "TENNIS 4" being executed by user C. The status image generation unit 150 causes the entirety of application display area 200b of user C to flash and does not cause the entirety of the application display area 200a of user A to flash. User B can know that user C is executing an application in which participation is permitted by seeing that the application execution area 200b flashing. The status image generation unit 150 may display the application display area 200 in different colors depending on whether participation is permitted or not. Alternatively, the status image generation unit 150 may use different character colors, character fonts, or character sizes. Since user B is interested in the fact that a friend is executing an application that user B can participate, the application display area 200 for the user executing an application that user B can participate is preferably displayed in a mode distinguished from the other areas.

Alternatively, the status image generation unit 150 may add the Join mark shown in FIG. 5 to the application display area 200b. In this way, the user can determine whether the user can participate in an application of a friend by seeing a friend screen, by causing the status image generation unit 150 to display the application display area 200 in different modes depending on whether the presence information includes participation permission information or includes participation prohibition information.

In the detailed information screen shown in FIG. 5, the Join mark 214 associated with the application (CAR RACE 2) that the user cannot participate is displayed in a non-selectable format. However, since user B cannot participate in "CAR RACE 2" being executed by user A, it is not highly necessary for user B to know that user A is executing "CAR RACE 2" in the detailed information screen. Therefore, the application display area 210 may only show applications that user B can participate. In this case, the status image generation unit 150 refers to the status information of the applications, displaying those applications that user B can participate and not displaying those applications that user B cannot participate. In the example of FIG. 5, two application names are displayed in a single application display area 210. Alternatively, a system may be built in which only one application name is displayed in a single application display area 210, in which the user B can participate, so that a plurality of the application display areas 210 are created in the detailed information screen. When the user taps one of the application display areas 210, the application may be started.

What is claimed is:

1. An information processing device, including a hardware processor operating under the instructions of one or more programs such that the information processing device includes a plurality of units, comprising:
    a communication unit;
    an acquisition unit configured to acquire, via the communication unit, presence information including status information indicating a status of execution of an application in a separate information processing device, the status information including information indicating a permission or a prohibition for participation by a user of the information processing device in a session of the application executed in the separate information processing device; and
    a status image generation unit configured to generate a status image indicating the status of the application, based on the acquired presence information, wherein the status image generation unit refers to the status information and determines a display mode for presenting the status of execution of the application to the user of the information processing device, such that:
    the status image indicates a name of the application of the separate information processing device,
    the status image is selectable by the user of the information processing device, such that selection of the status image by the user provides the user with an opportunity to participate in the session of the application executed in the separate information processing device, when participation in the session is permitted,
    selection of the status image by the user expands the status image to include more information about the application executed in the separate information processing device than is presented in the status image prior to selection, and the status image, expanded after selection, provides the user with an opportunity to participate in the session of the application executed in the separate information processing device, when participation in the session is permitted,
    the status image is displayed in different display modes depending on whether the user is allowed to participate in the session of the application or not, such that the status image includes at least one of: (i) one or more flashing portions indicating that participation in the session is permitted, (ii) one or more areas of different color indicating that participation in the session is permitted, (iii) one or more portions of text of the application in one or more different colors indicating that participation in the session is permitted, (iv) one or more portions of text of the application in one or more different fonts indicating that participation in the session is permitted, and (v) one or more portions of text of the application in one or more different font sizes indicating that participation in the session is permitted.

2. The information processing device according to claim 1, wherein the status image generation unit generates the status image such that:
    the status image, expanded after selection, provides the user with a mark that is selectable by the user when participation in the session is permitted, and is not selectable by the user when participation in the session is not permitted,
    a display mode of the mark indicates whether participation in the session is permitted, where the display mode of the mark is such that the mark includes one or more of: (i) one or more flashing portions indicating that participation in the session is permitted, (ii) one or more areas of different color indicating that participation in the session is permitted; (iii) one or more portions of text in one or more different colors indicating that participation in the session is permitted, (iv) one or more portions of text in one or more different fonts indicating that participation in the session is permitted, (v) one or more portions of text in one or more different font sizes indicating that participation in the session is permitted.

3. The information processing device according to claim 1, wherein the status image generation unit generates the status image including update information when there is a change in the status of the application, and generates an image indicating that the user is allowed to participate in the session of the application when the status information includes participation permission information.

4. The information processing device according to claim 1, further comprising:
    an execution unit configured to execute an application;
    a presence information generation unit configured to generate presence information including status information indicating the status of execution of the application; and
    a transmission unit configured to transmit the generated presence information via the communication unit.

5. The information processing device according to claim 4, wherein
    the execution unit determines whether a communication terminal can participate in the session of the application being executed, and
    the presence information generation unit includes, in the presence information, the resultant determination by the execution unit as the status information.

6. The information processing device according to claim 5, wherein the presence information generation unit generates presence information when there is a change in the resultant determination by the execution unit.

7. An information processing system in which a plurality of information processing devices are connected, wherein each information processing device comprises a hardware processor operating under the instructions of one or more programs such that each given information processing device among the plurality of information processing devices includes a plurality of units, comprising:

a communication unit;

an execution unit configured to execute an application;

a presence information generation unit configured to generate presence information including status information indicating a status of execution of at least one application of another of the plurality of information processing devices, the status information including information indicating a permission or a prohibition for participation by a user of the given information processing device in a session of the at least one application of the other information processing device;

a transmission unit configured to transmit the generated presence information via the communication unit;

an acquisition unit configured to acquire, via the communication unit, the presence information including the status information, where the status information includes respective status information of each of the plurality of information processing devices; and a status image generation unit configured to generate a status image indicating the status of the respective at least one application of each of the respective information processing devices, based on the acquired presence information, wherein the status image generation unit refers to the status information included in the acquired presence information and determines a display mode for presenting the status of execution of the at least one application of each of the respective information processing devices to the user of the given information processing device, such that:

the status image indicates a name of the at least one application of each of the respective information processing devices, the status image is selectable by the user of the given information processing device, such that selection of the status image by the user provides the user with an opportunity to participate in the session of the at least one application of each of the information processing devices, when participation in the session is permitted, selection of the status image by the user expands the status image to include more information about the application executed in the separate information processing device than is presented in the status image prior to selection, and the status image, expanded after selection, provides the user with an opportunity to participate in the session of the application executed in the separate information processing device, when participation in the session is permitted, the status image is displayed in different display modes depending on whether the user is allowed to participate in the session of the at least one application or not, such that the status image includes at least one of: (i) one or more flashing portions indicating that participation in the session is permitted, (ii) one or more areas of different color indicating that participation in the session is permitted, (iii) one or more portions of text of the at least one application in one or more different colors indicating that participation in the session is permitted, (iv) one or more portions of text of the at least one application in one or more different fonts indicating that participation in the session is permitted, and (v) one or more portions of text of the at least one application in one or more different font sizes indicating that participation in the session is permitted.

8. A non-transitory computer readable recording medium having stored therein a program capable of causing a hardware processing system or device to operate as an information processing device and exhibit functional modules, comprising:

a communication unit;

a module configured to acquire presence information including status information indicating the status of execution of an application in a separate information processing device connected to a network, via the communications unit, the status information including information indicating a permission or a prohibition for participation by a user of the information processing device in a session of the application executed in the separate information processing device;

a module configured to generate a status image indicating the status of the application, based on the acquired presence information, wherein the module configured to generate a status image refers to the status information to determine a display mode for presenting the status of execution of the application the user of the information processing device, such that:

the status image indicates a name of the application of the separate information processing device, the status image is selectable by the user of the information processing device, such that selection of the status image by the user provides the user with an opportunity to participate in the session of the application executed in the separate information processing device, when participation in the session is permitted, selection of the status image by the user expands the status image to include more information about the application executed in the separate information processing device than is presented in the status image prior to selection, and the status image, expanded after selection, provides the user with an opportunity to participate in the session of the application executed in the separate information processing device, when participation in the session is permitted, the status image is displayed in different display modes depending on whether the user is allowed to participate in the session of the application or not, such that the status image includes at least one of: (i) one or more flashing portions indicating that participation in the session is permitted, (ii) one or more areas of different color indicating that participation in the session is permitted, (iii) one or more portions of text of the application in one or more different colors indicating that participation in the session is permitted, (iv) one or more portions of text of the application in one or more different fonts indicating that participation in the session is permitted, and (v) one or more portions of text of the application in one or more different font sizes indicating that participation in the session is permitted.

9. The non-transitory computer readable recording medium according to claim 8, wherein the module configured to generate the status image generates the status image such that:

the status image, expanded after selection, provides the user with a mark that is selectable by the user when participation in the session is permitted, and is not selectable by the user when participation in the session is not permitted, a display mode of the mark indicates whether participation in the session is permitted, where the display mode of the mark is such that the mark includes one or more of: (i) one or more flashing portions indicating that participation in the session is permitted, (ii) one or more areas of different color indicating that participation in the session is permitted; (iii) one or more portions of text in one or more different colors indicating that participation in the session is permitted, (iv) one or more portions of text in one or more different fonts indicating that participation in the session is permitted, (v) one or more portions of text in one or more different font sizes indicating that participation in the session is permitted.

10. The non-transitory computer readable recording medium according to claim 8, wherein the module configured to generate the status image generates the status image such that the status image includes: update information when there is a change in the status of the application, and an image indicating that the user is allowed to participate in the session of the application when the status information includes participation permission information.

11. The non-transitory computer readable recording medium according to claim 8, wherein the functional modules further comprise:

an execution module configured to execute an application;
a presence information generation module configured to generate presence information including status information indicating the status of execution of the application; and
a transmission module configured to transmit the generated presence information via the communication unit.

12. The non-transitory computer readable recording medium according to claim 11, wherein:
the execution module determines whether a communication terminal can participate in the session of the application being executed, and
the presence information generation module includes, in the presence information, the resultant determination by the execution unit as the status information.

13. The non-transitory computer readable recording medium according to claim 12, wherein the presence information generation module generates presence information when there is a change in the resultant determination by the execution unit.

* * * * *